US 6,226,499 B1

(12) United States Patent
Nakatani et al.

(10) Patent No.: US 6,226,499 B1
(45) Date of Patent: May 1, 2001

(54) RADIO CIRCUIT APPARATUS AND RADIO COMMUNICATION EQUIPMENT

(75) Inventors: Toshifumi Nakatani, Moriguchi; Hisashi Adachi, Mino; Hiroaki Kosugi, Hirakata; Youichi Morinaga; Hiroyuki Itokawa, both of Yokohama; Shunsuke Hirano, Sagamihara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/359,663

(22) Filed: Jul. 26, 1999

(30) Foreign Application Priority Data

Jul. 13, 1998 (JP) .................................................. 10-218134

(51) Int. Cl.$^7$ ...................................................... H04B 1/40
(52) U.S. Cl. .............................. 455/78; 455/73; 455/76; 455/78; 455/86
(58) Field of Search .............................. 455/78, 76, 74, 455/73, 86, 85, 105, 112–113, 118, 147, 180.3, 183.1, 189.1

(56) References Cited

U.S. PATENT DOCUMENTS

| 4,812,783 | * | 3/1989 | Honjo et al. ........................... 331/17 |
| 5,428,824 | * | 6/1995 | Kasai ..................................... 455/78 |
| 5,483,679 | * | 1/1996 | Sasaki ..................................... 455/78 |
| 5,689,819 | * | 11/1997 | Nishimura et al. ..................... 455/78 |
| 5,793,819 |   | 8/1998 | Kawabata . |
| 5,825,813 | * | 3/1995 | Na .......................................... 455/78 |
| 5,831,483 | * | 1/1997 | Fukuda ................................... 331/17 |
| 5,892,405 | * | 4/1997 | Kamikubo et al. ..................... 331/16 |
| 5,929,677 | * | 11/1997 | Murata ................................... 331/17 |

* cited by examiner

Primary Examiner—Lee Nguyen
Assistant Examiner—Simon Nguyen
(74) Attorney, Agent, or Firm—Smith, Gambrell & Russell, LLP

(57) ABSTRACT

When the radio circuit apparatus is transmitting, the output signal of the first local oscillator 102 is inputted to the transmitted frequency converter 112 as well as to the frequency divider 104, and then the output signal of the frequency divider 104 is inputted to the modulator 111. The modulator 111 modulates the output signal of the frequency divider 104 with a base band signal. The output signal of the modulator 111 is inputted to the transmitted frequency converter 112, to be converted to the frequency of a transmitted signal by the output signal of the first local oscillator 102. When the radio circuit apparatus is receiving, the output signal of the low noise amplifier 121 is inputted to the first frequency converter 122 to be converted to the first intermediate frequency by the output signal of the first local oscillator 102. The output signal of the filter 123 is inputted to the second frequency converter circuit 124 to be converted to the second intermediate frequency by the output signal of the second local oscillator 103. Thereby, unnecessary components for transmission can be easily lowered to make it possible to miniaturize the radio circuit apparatus.

29 Claims, 5 Drawing Sheets prior art radio circuit apparatus radio circuit apparatus according to the present invention

RADIO CIRCUIT APPARATUS AND RADIO COMMUNICATION EQUIPMENT

BACKGROUND OF THE INVENTION

1. Field of the Invention

The present invention relates to miniaturizing the entirety of a radio circuit apparatus such as a cellular phone utilized in a high frequency radio communication system which employs the time division multiplex system.

2. Related Art of the Invention

In recent years, along with the development of mobile communication related markets such as that of cellular phones, a variety of application products utilizing a radio circuit apparatus appear in the market, and the miniaturization of radio circuit apparatus is becoming more and more important.

FIG. 5 shows an example of the structure of a conventional radio circuit apparatus. In this figure, 401 is a reference oscillator, 402 is a first local oscillator, 403 is a second local oscillator, 404 is a transmitting circuit, 405 is a receiving circuit, 406 is a shared device and 407 is an antenna. The output signal of the reference oscillator 401 is inputted to the first local oscillator 402 and the second local oscillator 403. And the output frequency of the second local oscillator 403 is fixed when the radio circuit apparatus is transmitting and when it is receiving, respectively.

In the transmitting circuit 404, 411 is a modulator, 412 is a filter, 413 is a transmitted frequency converter, 414 is a filter and 415 is a power amplifier. When the radio circuit apparatus is transmitting, the modulator 411 modulates the output signal of the second local oscillator 403 with a base band signal (a modulated signal).

The output signal of the modulator 411 is inputted into the transmitted frequency converter 413 after being reduced in the unnecessary frequency components by the filter 412, and converted into a frequency of a transmitted signal by the output signal of the first local oscillator 402. The output signal of the transmitted frequency converter 413 is amplified at the power amplifier 415 after being reduced in the unnecessary components by the filter 414, and transmitted from the antenna 407 through the shared device 406.

In the receiving circuit 405, 421 is a low noise amplifier, 422 is a first received frequency converter, 423 is a filter and 424 is a second received frequency converter. A signal received on the antenna 407 is inputted into the low noise amplifier 421 through the shared device 406. The output signal of the low noise amplifier 421 is inputted into the first frequency converter 422, and converted to the first intermediate frequency by the output signal of the first local oscillator 402. The output signal of the first frequency converter 422 is reduced in the unnecessary frequency components by the filter 423. The output signal of the filter 423 is inputted into the second frequency converter circuit 424 to be converted to the second intermediate frequency by the output signal of the second local oscillator 403.

In the above mentioned structure, however, when the radio circuit apparatus is transmitting, a harmonic component of the output signal from the second local oscillator 403 is generated in the transmitted frequency band, and the harmonic component tend to become an unnecessary frequency component for cellular phones close by. To prevent this problem, a large number of filters need to be provided, and as a result, the radio circuit apparatus as a whole would be bulky.

SUMMARY OF THE INVENTION

The present invention has a purpose, in light of the above problems, to provide a radio circuit apparatus and radio communication equipment to be able to be miniaturized without generating an unnecessary frequency component within the transmitted frequency band.

The first invention of the present invention (corresponding to claim 1) is a radio circuit apparatus utilized in a time division multiple access system characterized by comprising:

a local oscillator,
a frequency divider,
a modulator,
a transmitted frequency converter,
a first received frequency converter, and
a second received frequency converter, wherein, when the radio circuit apparatus is transmitting, an output signal of the local oscillator is inputted to the transmitted frequency converter and is inputted into the frequency divider and then divided into a predetermined dividing number to be a signal of a transmitted intermediate frequency; the modulator modulates the signal of the transmitted intermediate frequency with a modulating signal to be outputted to the transmitted frequency converter; and the transmitted frequency converter converts an output signal of the modulator to a transmitted signal by the output signal of the local oscillator, when the radio circuit apparatus is receiving, an output signal of the local oscillator is inputted into the first received frequency converter; the first received frequency modulator outputs an received signal to the second received frequency converter after converting the received signal into a signal of a first received intermediate frequency by the output signal of the local oscillator; the second received frequency converter converts the signal of the first received intermediate frequency into a signal of the second received intermediate frequency by a signal of a fixed frequency, output frequencies of the local oscillator are switched between when the radio circuit apparatus is transmitting and when the radio circuit apparatus is receiving.

The second invention of the present invention (corresponding to claim 8) is a radio communication equipment characterized by comprising;

a radio circuit apparatus according to the present invention, a power amplifier, a shared device and an antenna, wherein the output signal of the transmitted frequency converter is inputted to the power amplifier to be amplified, when the radio circuit apparatus is transmitting, an output signal of the power amplifier is selected by the shared device to be outputted from the antenna, when the radio circuit apparatus is receiving, a received signal inputted from the antenna is selected by the shared device to be inputted into the first received frequency converter.

BRIEF DESCRIPTION OF THE INVENTION

Figure 4A:
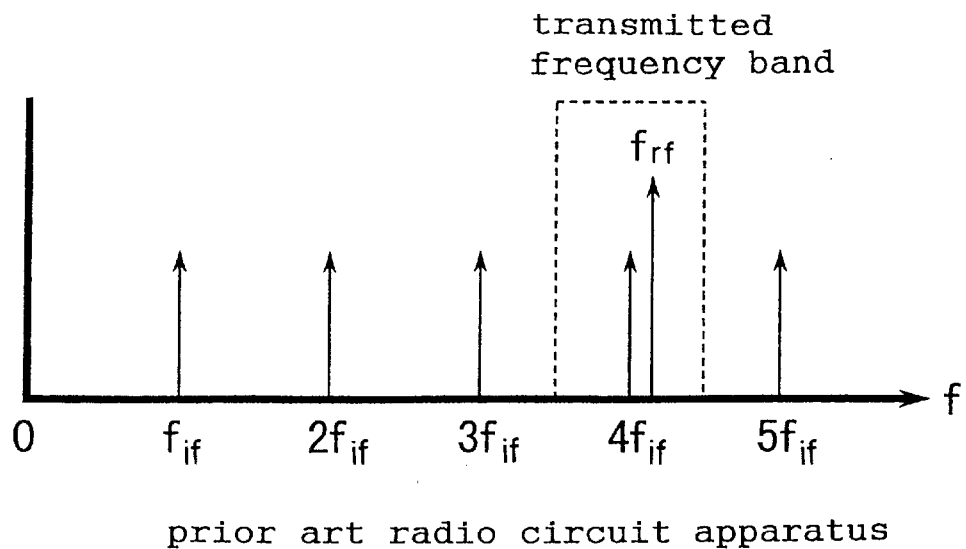
Figure 4B:
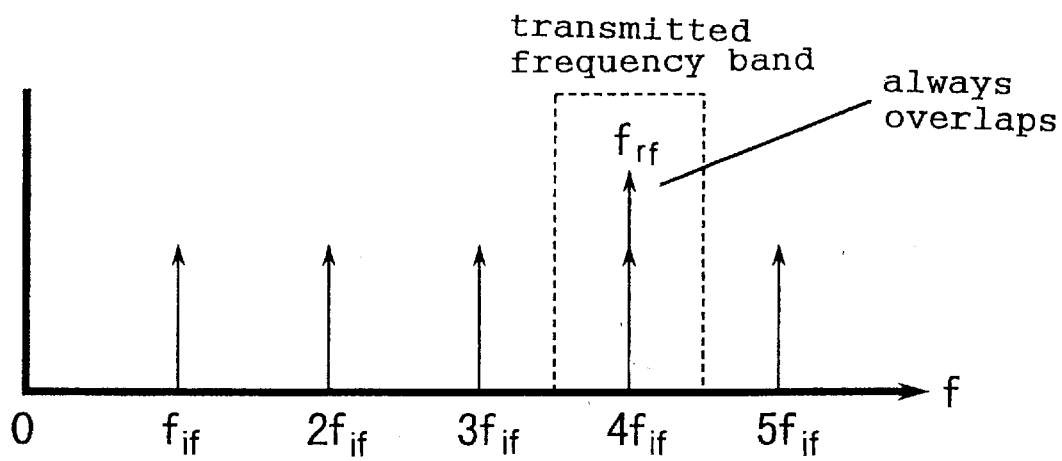

FIG. 4(*a*) and 4(*b*) are graphs showing the relationships between the transmitted frequency and the unnecessary frequency components in a mode of the prior art and the present invention, respectively.

Figure 5:
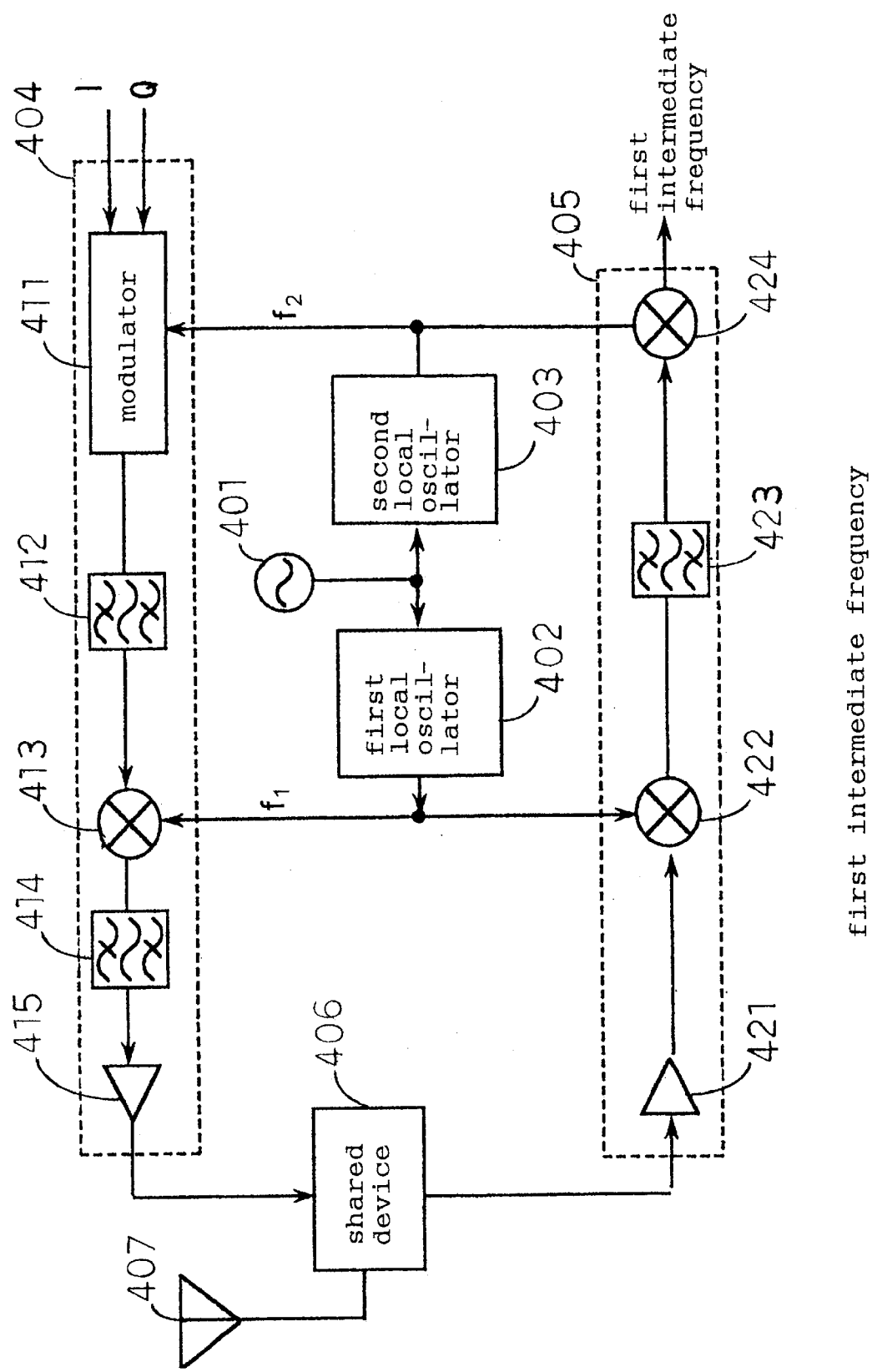

FIG. 5 is a block diagram showing the structure of a conventional radio circuit apparatus.

EXPLANATIONS OF NUMERALS 101, 301, 401 reference oscillator
102, 302, 402 first local oscillator 103, 403 second local oscillator
104, 303 frequency divider
304 multiplier
105, 306, 404 transmitting circuit
106, 307, 405 receiving circuit
107, 308, 406 shared device
108, 309, 407 antenna
111, 311, 411 modulator
112, 312, 413 transmitted frequency converter
114, 314, 415 power amplifier
121, 321, 421 low noise amplifier
122, 322, 422 first received frequency converter
124, 324, 424 second received frequency converter
113, 123, 305, 313, 323, 412, 414, 423 filter
201 voltage controlled oscillator
202 variable frequency divider
203 phase comparator
204 low pass filter
205 dividing number control circuit
206 reference frequency divider

PREFERRED EMBODIMENTS

Hereinafter, modes of radio circuits according to the present invention are described referring to the figures.

(Embodiment 1)

Figure 1:
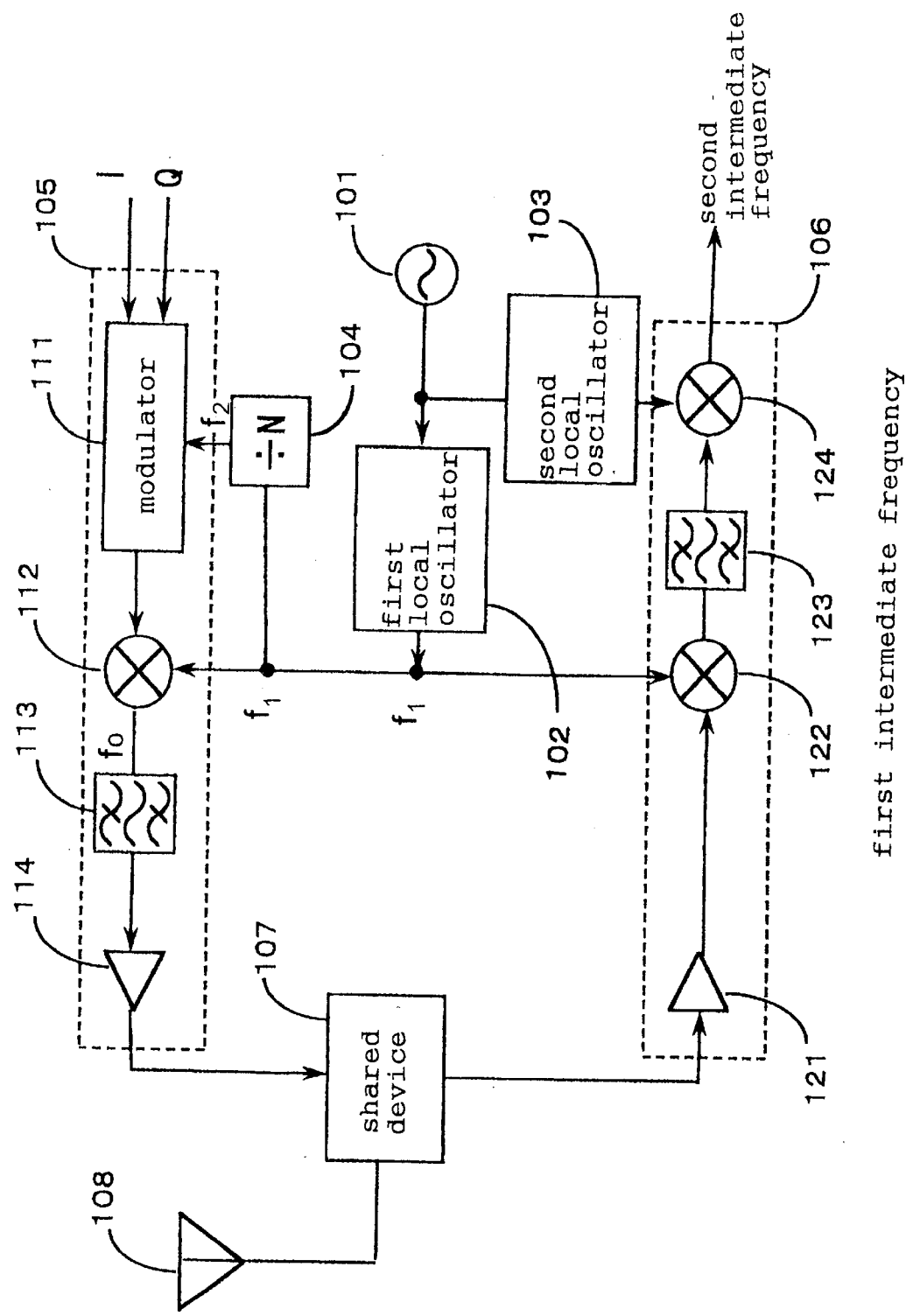
FIG. 1 is a block diagram showing the structure of mode 1 according to the invention.

FIG. 1 shows the structure of a radio circuit apparatus according to mode 1 of the invention. In the figure, 101 is a reference oscillator, 102 is a first local oscillator, 103 is a second local oscillator, 104 is a frequency divider, 105 is a transmitting circuit, 106 is a receiving circuit, 107 is a shared device and 108 is an antenna. The output signal of the reference oscillator 101 is inputted to the first local oscillator 102 and the second local oscillator 103. And the output frequency of the second local oscillator 103 is fixed. In the transmitting circuit 105, 111 is a modulator, 112 is a transmitted frequency converter, 113 is a filter and 114 is a power amplifier. In the receiving circuit 106, 121 is a low noise amplifier, 122 is a first received frequency converter, 123 is a filter and 124 is a second received frequency converter.

When the radio circuit apparatus is transmitting, the output signal of the first local oscillator 102 is inputted to the transmitted frequency converter 112 and inputted to the modulator 111 after being inputted to the frequency divider 104 to be divided in the frequency. The modulator 111 modulates the output signal of the frequency divider 104 with a base band signal. The output signal of the modulator 111 is inputted to the transmitted frequency converter 112 to be converted to a frequency of a transmitted signal by the output signal of the first local oscillator 102. The output signal of the transmitted frequency converter 112 is amplified at the power amplifier 114 after being reduced in the unnecessary frequency components by the filter 113, and is passed through the shared device 107 to be transmitted from the antenna 108.

When the radio circuit apparatus is receiving, a signal received on the antenna 108 is passed through the shared device 107 to be inputted to the low noise amplifier 121. The output signal of the low noise amplifier 121 is inputted to the first frequency converter 122 to be converted to the first intermediate frequency by the output signal of the first local oscillator 102. The output signal of the first frequency converter 122 is reduced in the unnecessary frequency components by the filter 123. The output signal of the filter 123 is inputted to the second frequency converter circuit 124 to be converted to the second intermediate frequency by the output signal of the second local oscillator 103.

TABLE 1

|  | Prior art ($f_2$ fixed) | The present invention ($f_2$ variable) |
|---|---|---|
| The relationships between $f_1$ and $f_2$ | $f_1 = (P + \Delta q) \cdot f_2 \ldots 501$<br>$\begin{cases} -0.5 \leq \Delta q < 0.5 \\ P = 0, 1, 2, 3 \cdots \end{cases}$ | $f_1 = N \cdot f_2 \ldots 505$<br>$(N = 1, 2, 3, \ldots)$ |
| The relationships between $f_0$ and $f_2$ | $f_0 + (P + 1 = \Delta q) \cdot f_2 \ldots 502$ | $f_0 = (N + 1) \cdot f_2 \ldots 506$ |
| Harmonic of $f_2$ of which frequency is the closest to $f_0$ | $(P+1) \cdot f_2 = \left(1 - \dfrac{\Delta q}{P+1+\Delta q}\right) \cdot f_0 \ldots 503$ | $(N+1 \pm 1) \cdot f_2 = \left(1 \pm \dfrac{1}{N+1}\right) \cdot f_0 \ldots 507$<br>Wherein the component of $(N + 1) \cdot f_2$ always overlaps $f_0$ and is buried in the transmitted signal not to affect others. |
| Frequency difference between the above frequency and $f_0$ | $\left\lvert \dfrac{\Delta q}{P+1+\Delta q}\right\rvert \cdot f_0 \ldots 504$ | $\dfrac{1}{N+1} \cdot f_0 \ldots 508$ |

In case N = P, $$\dfrac{1}{N+1} \cdot f_0 < \dfrac{1}{N+1} \cdot f_0 \ldots 509$$

therefore, unnecessary frequency components could be removed more easily according to the invention.

The harmonic of the modulator 111 in such a structure is an unnecessary frequency component, and those unnecessary frequency components other than the transmitted signal must be fully attenuated so as not to affect cellular phones close by. This unnecessary frequency component in the mode has characteristics of being removed more easily compared to unnecessary frequency components according to the prior art as described below.

That is to say, in case a carrier signal inputted to the modulator 111 is what the output signal from the first local oscillator 102 is divided by the frequency divider 104 like in the present mode, an unnecessary component doesn't appear in the vicinity of the transmitted frequency. Contrarily, in case a carrier signal inputted into the modulator 411 is not what the output signal of the first local oscillator 402 is divided by a frequency divider like in the prior art, there is some possibility that an unnecessary component appears in the vicinity of the transmitted frequency.

In describing this phenomena, the above table 1 is referred to.

The output frequency of the first local oscillator 102 is put as $f_1$ and a frequency of a carrier signal inputted into the modulator 111 is put as $f_2$. In the prior art, the frequency of a carrier signal is supposed to be an invariable frequency irrelevant to the first local oscillator 102. In the present mode, the frequency of a carrier signal is what the output of the first local oscillator 102 is divided into 1/N at the frequency divider 104. In this case, the transmitted frequency $f_0$ is the sum of the output frequency $f_1$ of the first local oscillator 102 and the frequency $f_2$ of the carrier signal inputted into the modulator 111. Therefore the relationships between $f_1$ and $f_2$ is described as 501 in table 1 according to the prior art. In the present mode, the carrier signal inputted into the modulator 111 is what the output signal of the first oscillator 102 is divided with the frequency divider 104, which is expressed as 505 in table 1. Furthermore, the relationships between $f_0$ and $f_2$ is described as 502 in table 1 according to the prior art, and as 506 in table 1 according to the present mode. A conventional unnecessary frequency component is put as $f_{if}$ and a transmitted frequency is put as $f_{rf}(f_0)$ to show their relationships (a) according to the prior art and their relationships (b) according to the present mode in FIG. 4.

Accordingly, a harmonic ($f_{if}$) of the frequency $f_2$ of the carrier signal inputted into the modulator 111 of which frequency is the closest to the transmitted frequency $f_0$ is as follows. Namely, it is 503 in table 1 according to the prior art and 507 in table 1 according to the present mode. Note that, in the present mode, the component of $(N+1)\cdot f_2$ always overlaps the transmitted frequency $f_0$. And because it is buried in the transmitted signal, it doesn't affect others.

Absolute values of differences between those harmonic frequencies and the transmitted frequency $f_0$ are expressed as 504 in table 1 according to the prior art and 508 in table 1 according to the present mode. In case N=P, 509 in table 1 is always realized. That is to say, a harmonic of the carrier signal inputted in the modulator 111 appears closer to the transmitted frequency $f_0$ in the prior art than in the present mode. The same thing can be said in case $f_0=f_1-f_2$.

Accordingly, in the present mode where the carrier signal inputted into the modulator 111 is what the output signal of the first local oscillator 102 is divided with the frequency divider 104, an unnecessary component won't appear in the vicinity of the transmitted frequency, however, in the prior art where the carrier signal inputted into the modulator 111 is not what the output signal of the first local oscillator 102 is divided with the frequency divider 104, there is some possibility that an unnecessary frequency component appears in the vicinity of the transmitted frequency.

Therefore, those unnecessary frequency components must be removed, which is easier in the present mode than in the prior art, because the further an unnecessary frequency component is apart from the transmitted signal, the easier it is to attenuate it by a filter or the like as mentioned above.

Consequently, the structure of the radio circuit apparatus according to the present mode makes it possible to simplify the filter and as a result it becomes possible to miniaturize the radio circuit apparatus as a whole.

Furthermore, in case the transmitted frequency is higher than the received frequency, by properly selecting the dividing number of the frequency divider 104, the oscillation frequencies of the first local oscillator 102 can be close frequencies between when the radio circuit apparatus is transmitting and when it is receiving. In general, the oscillation frequency range of an oscillator and C/N are in the relationship of trade-off. Oscillation frequencies of the first local oscillator will not dramatically change when the radio circuit apparatus is transmitting and when it is receiving in the present mode, therefore, C/N of the first local oscillator 102 has a good value and a modulated wave of the output of the transmitting circuit 105 can provide a very good precision.

It is preferable to use a fractional frequency division type PPL frequency synthesizer as the first local oscillator 102.

Frequency gaps of channels for transmission and for reception are usually at even intervals. In this case, the frequency gaps of the first local oscillator 102 differs between when the radio circuit apparatus is transmitting and when it is receiving. The reason for the difference is explained as follows.

Frequencies of the transmitted waves are put as $f_{rf}(1)$, $f_{rf}(2)$, ..., and frequencies of received waves are put as $f_{RF}(1)$, $f_{RF}(2)$, ..., then $f_{rf}(m+1)-f_{rf}(m)=\Delta f$ and $f_{RF}(m+1)-f_{RF}(m)=\Delta f$, wherein m=1, 2, 3, 4, .... That is to say, channel gaps have an invariable value of $\Delta f$ either when the radio circuit apparatus is transmitting and when it is receiving. Then a frequency gap between adjoining channels of the first local oscillator 102 when the radio circuit apparatus is transmitting and a frequency gap between adjoining channels when the radio circuit apparatus is receiving are to be found. Output frequencies of the modulator 111 are put as $f_{if}(1)$, $f_{if}(2)$, ... and output frequencies of the first local oscillator 102 when the radio circuit apparatus is transmitting are put as $f_{lo}(1)$, $f_{lo}(2)$, ... and output frequencies of the first local oscillator 102 when the radio circuit apparatus is receiving are put as $f_{LO}(1)$, $f_{LO}(2)$, .... And the first intermediate frequency when the radio circuit apparatus is receiving is fixed, which is put as $f_{IF1}$.

$$f_{rf}(n)=f_{lo}(n)+f_{if}(n) \quad \text{[Equation 1]}$$

$$f_{if}(n)=f_{lo}(n)/N \quad \text{[Equation 2]}$$

$$|f_{RF}(n)-f_{LO}(n)|=f_{IF1} \quad \text{[Equation 3]}$$

As above mentioned, the transmitted frequency is described as equation 1 and the output frequency of the modulator 111 is described as equation 2. And the relationship of the frequencies when the radio circuit apparatus is receiving is described as equation 3, wherein n=1, 2, 3, .... By substituting equation 2 in equation 1, $f_{if}(n)$ is eliminated to find equation 4.

$$f_{rf}(n) = \left(1 + \frac{1}{N}\right)f_{lo}(n) \quad \text{[Equation 4]}$$

$$f_{rf}(n-1) = \left(1 + \frac{1}{N}\right)f_{lo}(n-1) \quad \text{[Equation 5]}$$

$$f_{rf}(n) - f_{rf}(n-1) = \left(1 + \frac{1}{N}\right)\{f_{lo}(n) - f_{lo}(n-1)\} \quad \text{[Equation 6]}$$

$$\Delta f = \left(1 + \frac{1}{N}\right)\{f_{lo}(n) - f_{lo}(n-1)\} \quad \text{[Equation 7]}$$

$$f_{lo}(n) - f_{lo}(n-1) = \frac{N}{N+1}\Delta f \quad \text{[Equation 8]}$$

In equation 4, n is put as n-i to obtain equation 5. Equation 5 is subtracted from equation 4 in respective sides to obtain equation 6. In equation 6, $f_{rf}(n)-f_{rf}(n-1)=\Delta f$ then equation 7 is obtained. Equation 7 is arranged to obtain equation 8. That is to say, the gap of the output frequencies of the first local oscillator 102 when the radio circuit apparatus is transmitting is $N \cdot \Delta f/(N+1)$.

$$f_{if}(n)-f_{if}(n-1)=\{f_{lo}(n)-f_{lo}(n-1)\}/N \quad \text{[Equation 9]}$$

$$f_{if}(n) - f_{if}(n-1) = \frac{\Delta f}{N+1} \quad \text{[Equation 10]}$$

$$f_{RF}(n)-f_{RF}(n-1)=f_{LO}(n)-f_{LO}(n-1) \quad \text{[Equation 11]}$$

$$f_{LO}(n)-f_{LO}(n-1)=\Delta f \quad \text{[Equation 12]}$$

Next, an equation where n is put as n-i in equation 2 is subtracted from equation 2 in respective sides to obtain equation 9. Then, equation 8 is substituted in equation 9 to obtain equation 10. That is to say, the output frequency gap of the modulator 111 when the radio circuit apparatus is transmitting is $\Delta f/(N+1)$. In addition, as for equation 3, when $f_{RF}(n)-f_{LO}(n)>0$, what n is put as n-1 in equation 3 is subtracted from equation 3 in respective sides to obtain equation 11. In equation 11, $f_{RF}(n)-f_{RF}(n-1)=\Delta f$, then equation 12 is obtained. The same thing can be said when $f_{RF}(n)-f_{LO}(n)<=0$. Consequently, the output frequency gap of the first local oscillator 102 when the radio circuit apparatus is receiving is $\Delta f$.

The above is the explanation about why, in case the gaps of channel frequency for transmission and for reception are at even intervals, the frequency gaps of the first local oscillator 102 differ between when the radio circuit apparatus is transmitting and when it is receiving.

Under such circumstances, the following disadvantages arise when conventional PLL frequency synthesizer is used as a local oscillator. Namely, when the frequency of the reference signal inputted is decided, the gap of the output frequencies has a certain value, while in case the oscillation frequency gaps of the first local oscillator 102 differ between when the radio circuit apparatus is receiving and when it is transmitting such as in the present mode, the frequency of the reference signal needs to be changed between when the radio circuit apparatus is transmitting and when it is receiving. For this purpose, two reference oscillators or the equivalent equipment as these would be necessary, which ends up with a bulky scale of the circuit.

Therefore, a fractional frequency division type of PLL frequency synthesizer as described below can be used to output signals of which frequency gaps of the local oscillator differ without changing the frequency of the reference signal and without generally changing the circuit scale.

Figure 2:
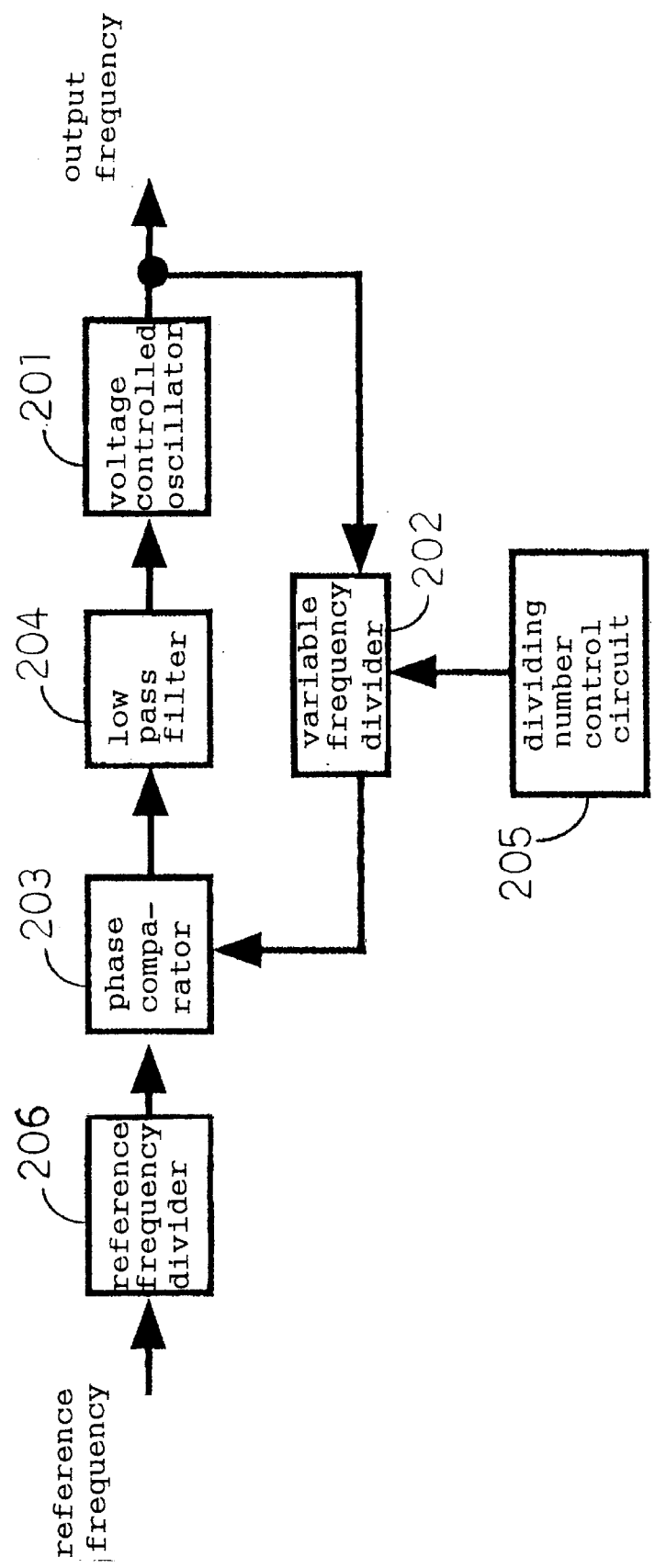
FIG. 2 is a block diagram showing the structure of a fractional dividing type PLL frequency synthesizer.

FIG. 2 illustrates the structure of a fractional frequency division type PLL frequency synthesizer. In this figure, 201 is a voltage controlled oscillator, 202 is a variable frequency divider, 203 is a phase comparator, 204 is a low pass filter, 205 is a dividing number control circuit and 206 is a reference frequency divider. In accordance with a set value by the dividing number control circuit 205, the variable frequency divider 202 divides and then outputs the output signal frequency of the voltage controlled oscillator 201. The reference frequency divider 206 divides the reference signal to be outputted as a phase comparison frequency. The phase comparator 203 compares phases of the output signal of the variable frequency divider 202 and of the output signal of the reference frequency divider 206 output a phase difference signal. This phase difference signal is inputted to the voltage controlled oscillator 201 after being smoothed by the low pass filter 204. The voltage controlled oscillator 201 controls the frequency of the output signal based on the phase difference signal inputted. In the above mentioned structure, by changing periodically the dividing number of the variable frequency divider 202 by the dividing number control circuit 205, a dividing number with precision below decimal point on average is implemented, and as a result, the phase comparison frequency can be set higher than the frequency gap of a desired output signal. And, because of the high phase comparison frequency, the frequency of the output signal can be switched at high speed.

Consequently, in the present mode, the frequency channel gaps of the local oscillator when the radio circuit apparatus is transmitting and the frequency channel gaps of the local oscillator when the radio circuit apparatus is receiving are different from each other. By using a fractional frequency division type PLL frequency synthesizer as a local oscillator in this case, it is possible to maintain the same phase comparison frequency between when the radio circuit apparatus is transmitting and when it is receiving, because the phase comparison frequencies need not to be maintained at the frequency channel intervals of the local oscillator. As a result, the frequency of the reference oscillator needs not to be switched between when the radio circuit apparatus is transmitting and when it is receiving, therefore the output of the local oscillator has stable characteristics.

In addition, either or both between the shared device 107 and the low noise amplifier 121 and/or between the low noise amplifier 121 and the first frequency converter 122, a filter or filters may be provided.

Furthermore, it is possible to utilize the output signal of the PLL frequency synthesizer as the signal of fixed frequency inputted to the second received frequency converter 124. Namely, it is possible to use the output signal of the PLL frequency synthesizer as the second local oscillator.

The first local oscillator 402 of the present mode is an example of a local oscillator according to the present invention.

(Embodiment 2)

Figure 3:
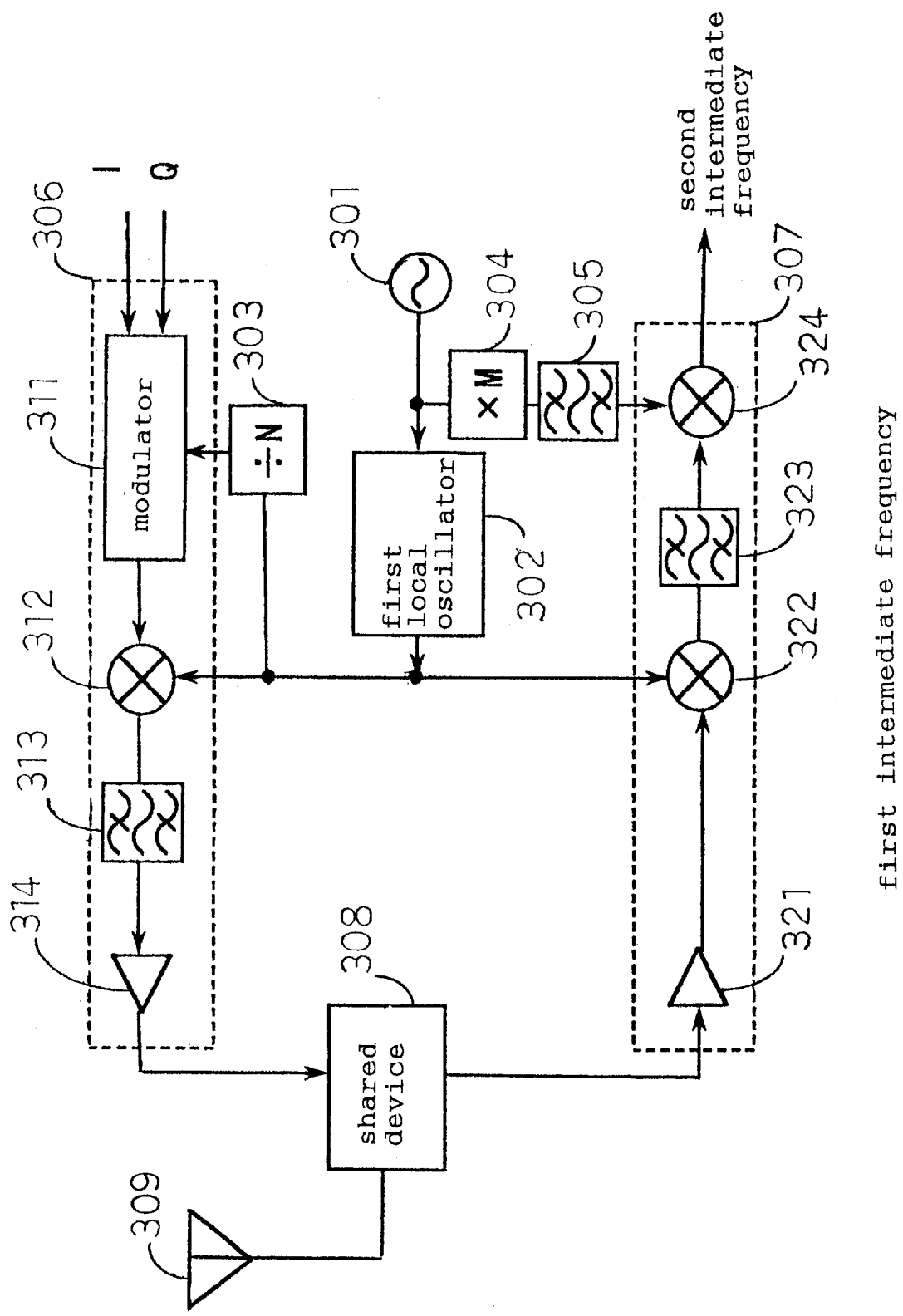
FIG. 3 is a block diagram showing the structure of mode 2 according to the invention.

FIG. 3 illustrates the structure of a radio circuit apparatus according to mode 2 of the present invention. In the figure, 301 is a reference oscillator, 302 is a first local oscillator, 303 is a frequency divider, 304 is a multiplier, 305 is a filter, 306 is a transmitting circuit, 307 is a receiving circuit, 308 is a shared device and 309 is an antenna. The output signal of the reference oscillator 301 is inputted into the first local oscillator 302 and is reduced in the unnecessary frequency components by the filter 305 after being inputted to the multiplier 304 to be multiplied.

In the transmitting circuit 306, 311 is a modulator, 312 is a transmitted frequency converter, 313 is a filter and 314 is a power amplifier; When the radio circuit apparatus is transmitting, the output signal of the first local oscillator 302 is inputted to the transmitted frequency converter 312 and inputted to the modulator 311 after being inputted to the frequency divider 303 to be divided. The modulator 311 modulates the output signal of the frequency divider 303 with a base band signal. The output signal of the modulator 311 is inputted into the transmitted frequency converter 312 to be converted to a frequency of a transmitted signal by the output signal of the first local oscillator 302. The output signal of the transmitted frequency converter 312 is amplified at the power amplifier 314 after being reduced in the necessary frequency components by the filter 313, and is passed through the shared device 308 to be transmitted from the antenna 309.

In the receiving circuit 307, 321 is a low noise amplifier, 322 is a first received frequency converter, 323 is a filter and 324 is a second received frequency converter. A signal received on the antenna 309 is passed through the shared device 308 to be inputted to the low noise amplifier 321. The output signal of the low noise amplifier 321 is inputted to the first frequency converter 322 and converted to the first intermediate frequency by the output signal of the first local oscillator 302. The output signal of the first frequency converter 322 is reduced in the unnecessary components by the filter 323. The output signal of the filter 323 is inputted into the second frequency converter 324 to be converted to the second intermediate frequency by the output signal of the filter 305.

The present mode differs from mode 1 shown in FIG. 1 in the point that, instead of inputting the output signal of the second local oscillator into the second received frequency converter, multiplied waves of the reference oscillator is inputted. In addition, by omitting the second local oscillator of which circuit scale is bulky with a massive power consumption, the radio circuit apparatus is designed to be miniaturized with a lower power consumption.

Moreover, in case the transmitted frequency is higher than the received frequency, by properly selecting the dividing number of the frequency divider 303, the oscillation frequencies of the first local oscillator 302 can be close frequencies between when the radio circuit apparatus is transmitting and when it is receiving. Thereby, C/N of the first local oscillator 302 can be better and modulated waves of the output of the transmitting circuit 306 can have a better precision.

It is preferable to use a fractional frequency division type PLL frequency synthesizer as the first local oscillator 302 like in mode 1. Thereby, the unnecessary components can be easily attenuated by the filter when the radio circuit apparatus is transmitting in the present mode just like in mode 1, which makes it possible to miniaturize the radio circuit apparatus as a whole.

Furthermore, either or both between the shared device 308 and the low noise amplifier 321 and/or between the low noise amplifier 321 and the first frequency converter 322, a filter or filters may be provided.

The first local oscillator 302 in the present mode is an example of the local oscillator according to the present invention.

As mentioned above, according to the present invention, the radio circuit apparatus that won't generate the unnecessary frequency components within the transmitted frequency band and that is able to be miniaturized can be implemented.

What is claimed is:

1. A radio circuit apparatus utilized in a time division multiple access system comprising:
   a local oscillator;
   a frequency divider;
   a modulator;
   a transmitted frequency converter;
   a first received frequency converter; and
   a second received frequency converter, wherein:
      when the radio circuit apparatus is transmitting, an output signal of the local oscillator is inputted to the transmitted frequency converter and is inputted into the frequency divider and then divided into a predetermined dividing number to be a signal of a transmitted intermediate frequency; the modulator modulates the signal of the transmitted intermediate frequency with a modulating signal to be outputted to the transmitted frequency converter; and the transmitted frequency converter converts an output signal of the modulator to a transmitted signal by the output signal of the local oscillator,
      when the radio circuit apparatus is receiving, an output signal of the local oscillator is inputted into the first received frequency converter; the first received frequency modulator outputs a received signal to the second received frequency converter after converting the received signal into a signal of a first received intermediate frequency by the output signal of the local oscillator; the second received frequency converter converts the signal of the first received intermediate frequency into a signal of the second received intermediate frequency by a signal of a fixed frequency, and
      output frequencies of the local oscillator are switched between when the radio circuit apparatus is transmitting and when the radio circuit apparatus is receiving.

2. A radio circuit apparatus according to claim 1 wherein a frequency of the transmitted signal and a frequency of the received signal are different.

3. A radio circuit apparatus according to claim 1, utilizing an output signal of a PLL frequency synthesizer as the signal of the fixed frequency inputted to the second received frequency converter.

4. A radio circuit apparatus according to claim 2, utilizing an output signal of a PLL frequency synthesizer as the signal of the fixed frequency inputted to the second received frequency converter.

5. A radio circuit apparatus according to claim 1, having a reference oscillator which outputs a reference signal to the local oscillator, and utilizing a multiplied wave signal of an output signal of the reference oscillator as the signal of the fixed frequency inputted into the second received frequency converter.

6. A radio circuit apparatus according to claim 2, having a reference oscillator which outputs a reference signal to the local oscillator, and utilizing a multiplied wave signal of an output signal of the reference oscillator as the signal of the fixed frequency inputted into the second received frequency converter.

7. A radio circuit apparatus according to claim 1 wherein:
   the local oscillator is a fractional frequency division type PLL frequency synthesizer, the PLL frequency synthesizer having a phase comparator, a low pass filter, a voltage controlled oscillator, a variable frequency divider, and a dividing number control circuit;
   the variable frequency divider divides an output signal of the voltage controlled oscillator;
   the phase comparator detects a phase difference between an output signal of the variable frequency divider and a signal of a phase comparison frequency;
   the low pass filter smooths an output signal of the phase comparator; and
   the voltage controlled oscillator controls a frequency of an output signal by an output of the low pass filter, the dividing number control circuit outputting a frequency gained by multiplying the phase comparison frequency by a non-integer from the voltage controlled oscillator, by periodically changing a dividing number of the variable frequency divider.

8. A radio circuit apparatus according to claim 2 wherein:
the local oscillator is a fractional frequency division type PLL frequency synthesizer, the PLL frequency synthesizer having a phase comparator, a low pass filter, a voltage controlled oscillator, a variable frequency divider, and a dividing number control circuit;
the variable frequency divider divides an output signal of the voltage controlled oscillator;
the phase comparator detects a phase difference between an output signal of the variable frequency divider and a signal of a phase comparison frequency;
the low pass filter smooths an output signal of the phase comparator; and
the voltage controlled oscillator controls a frequency of an output signal by an output of the low pass filter, the dividing number control circuit outputting a frequency gained by multiplying the phase comparison frequency by a non-integer from the voltage controlled oscillator, by periodically changing a dividing number of the variable frequency divider.

9. A radio circuit apparatus according to claim 3 wherein:
the local oscillator is a fractional frequency division type PLL frequency synthesizer, the PLL frequency synthesizer having a phase comparator, a low pass filter, a voltage controlled oscillator, a variable frequency divider, and a dividing number control circuit;
the variable frequency divider divides an output signal of the voltage controlled oscillator;
the phase comparator detects a phase difference between an output signal of the variable frequency divider and a signal of a phase comparison frequency;
the low pass filter smooths an output signal of the phase comparator; and
the voltage controlled oscillator controls a frequency of an output signal by an output of the low pass filter, the dividing number control circuit outputting a frequency gained by multiplying the phase comparison frequency by a non-integer from the voltage controlled oscillator, by periodically changing a dividing number of the variable frequency divider.

10. A radio circuit apparatus according to claim 4 wherein:
the local oscillator is a fractional frequency division type PLL frequency synthesizer, the PLL frequency synthesizer having a phase comparator, a low pass filter, a voltage controlled oscillator, a variable frequency dividers and a dividing number control circuit;
the variable frequency divider divides an output signal of the voltage controlled oscillator;
the phase comparator detects a phase difference between an output signal of the variable frequency divider and a signal of a phase comparison frequency;
the low pass filter smooths an output signal of the phase comparator; and
the voltage controlled oscillator controls a frequency of an output signal by an output of the low pass filter, the dividing number control circuit outputting a frequency gained by multiplying the phase comparison frequency by a non-integer from the voltage controlled oscillator, by periodically changing a dividing number of the variable frequency divider.

11. A radio circuit apparatus according to claim 5 wherein:
the local oscillator is a fractional frequency division type PLL frequency synthesizer, the PLL frequency synthesizer having a phase comparator, a low pass filter, a voltage controlled oscillator, a variable frequency dividers and a dividing number control circuit;
the variable frequency divider divides an output signal of the voltage controlled oscillator;
the phase comparator detects a phase difference between an output signal of the variable frequency divider and a signal of a phase comparison frequency;
the low pass filter smooths an output signal of the phase comparator; and
the voltage controlled oscillator controls a frequency of an output signal by an output of the low pass filter, the dividing number control circuit outputting a frequency gained by multiplying the phase comparison frequency by a non-integer from the voltage controlled oscillator, by periodically changing a dividing number of the variable frequency divider.

12. A radio circuit apparatus according to claim 6 wherein:
the local oscillator is a fractional frequency division type PLL frequency synthesizer, the PLL frequency synthesizer having a phase comparator, a low pass filter, a voltage controlled oscillator, a variable frequency divider, and a dividing number control circuit;
the variable frequency divider divides an output signal of the voltage controlled oscillator;
the phase comparator detects a phase difference between an output signal of the variable frequency divider and a signal of a phase comparison frequency;
the low pass filter smooths an output signal of the phase comparator; and
the voltage controlled oscillator controls a frequency of an output signal by an output of the low pass filter, the dividing number control circuit outputting a frequency gained by multiplying the phase comparison frequency by a non-integer from the voltage controlled oscillator, by periodically changing a dividing number of the variable frequency divider.

13. A radio circuit apparatus according to claim 7 wherein the phase comparison frequency of the local oscillator are equal between when the radio circuit apparatus is transmitting and when the radio circuit apparatus is receiving.

14. A radio circuit apparatus according to claim 8 wherein the phase comparison frequency of the local oscillator are equal between when the radio circuit apparatus is transmitting and when the radio circuit apparatus is receiving.

15. A radio circuit apparatus according to claim 9 wherein the phase comparison frequency of the local oscillator are equal between when the radio circuit apparatus is transmitting and when the radio circuit apparatus is receiving.

16. A radio circuit apparatus according to claim 10 wherein the phase comparison frequency of the local oscillator are equal between when the radio circuit apparatus is transmitting and when the radio circuit apparatus is receiving.

17. A radio circuit apparatus according to claim 11 wherein the phase comparison frequency of the local oscillator are equal between when the radio circuit apparatus is transmitting and when the radio circuit apparatus is receiving.

18. A radio circuit apparatus according to claim 12 wherein the phase comparison frequency of the local oscillator are equal between when the radio circuit apparatus is transmitting and when the radio circuit apparatus is receiving.

19. A radio circuit apparatus according to claim 2 wherein the frequency of the transmitted signal is higher than the frequency of the received signal, and the dividing number of the frequency divider is selected so that the output frequency of the first local oscillator falls within a predetermined range when the radio circuit apparatus is transmitting and when the radio circuit apparatus is receiving.

20. A radio circuit apparatus according to claim 3 wherein the frequency of the transmitted signal is higher than the frequency of the received signal, and the dividing number of the frequency divider is selected so that the output frequency of the first local oscillator falls within a predetermined range when the radio circuit apparatus is transmitting and when the radio circuit apparatus is receiving.

21. A radio circuit apparatus according to claim 4 wherein the frequency of the transmitted signal is higher than the frequency of the received signal, and the dividing number of the frequency divider is selected so that the output frequency of the first local oscillator falls within a predetermined range when the radio circuit apparatus is transmitting and when the radio circuit apparatus is receiving.

22. A radio circuit apparatus according to claim 5 wherein the frequency of the transmitted signal is higher than the frequency of the received signal, and the dividing number of the frequency divider is selected so that the output frequency of the first local oscillator falls within a predetermined range when the radio circuit apparatus is transmitting and when the radio circuit apparatus is receiving.

23. A radio circuit apparatus according to claim 6 wherein the frequency of the transmitted signal is higher than the frequency of the received signal, and the dividing number of the frequency divider is selected so that the output frequency of the first local oscillator falls within a predetermined range when the radio circuit apparatus is transmitting and when the radio circuit apparatus is receiving.

24. A radio communication equipment comprising:
a radio circuit apparatus according to claim 1, a power amplifier, a shared device, and an antenna, wherein the output signal of the transmitted frequency converter is inputted to the power amplifier to be amplified;
when the radio circuit apparatus is transmitting, an output signal of the power amplifier is selected by the shared device to be outputted from the antenna; and
when the radio circuit apparatus is receiving, a received signal inputted from the antenna is selected by the shared device to be inputted into the first received frequency converter.

25. A radio communication equipment comprising:
a radio circuit apparatus according to claim 2, a power amplifier, a shared device, and an antenna, wherein the output signal of the transmitted frequency converter is inputted to the power amplifier to be amplified;
when the radio circuit apparatus is transmitting, an output signal of the power amplifier is selected by the shared device to be outputted from the antenna; and
when the radio circuit apparatus is receiving, a received signal inputted from the antenna is selected by the shared device to be inputted into the first received frequency converter.

26. A radio communication equipment comprising:
a radio circuit apparatus according to claim 3, a power amplifier, a shared device, and an antenna, wherein the output signal of the transmitted frequency converter is inputted to the power amplifier to be amplified;
when the radio circuit apparatus is transmitting, an output signal of the power amplifier is selected by the shared device to be outputted from the antenna; and
when the radio circuit apparatus is receiving, a received signal inputted from the antenna is selected by the shared device to be inputted into the first received frequency converter.

27. A radio communication equipment comprising:
a radio circuit apparatus according to claim 4, a power amplifier, a shared device, and an antenna, wherein the output signal of the transmitted frequency converter is inputted to the power amplifier to be amplified;
when the radio circuit apparatus is transmitting, an output signal of the power amplifier is selected by the shared device to be outputted from the antenna; and
when the radio circuit apparatus is receiving, a received signal inputted from the antenna is selected by the shared device to be inputted into the first received frequency converter.

28. A radio communication equipment comprising:
a radio circuit apparatus according to claim 5, a power amplifier, a shared device, and an antenna, wherein the output signal of the transmitted frequency converter is inputted to the power amplifier to be amplified;
when the radio circuit apparatus is transmitting, an output signal of the power amplifier is selected by the shared device to be outputted from the antenna; and
when the radio circuit apparatus is receiving, a received signal inputted from the antenna is selected by the shared device to be inputted into the first received frequency converter.

29. A radio communication equipment comprising:
a radio circuit apparatus according to claim 6, a power amplifier, a shared device, and an antenna, wherein the output signal of the transmitted frequency converter is inputted to the power amplifier to be amplified;
when the radio circuit apparatus is transmitting, an output signal of the power amplifier is selected by the shared device to be outputted from the antenna; and
when the radio circuit apparatus is receiving, a received signal inputted from the antenna is selected by the shared device to be inputted into the first received frequency converter.

* * * * *